United States Patent
Green (10) Patent No.: US 11,819,994 B2
(45) Date of Patent: Nov. 21, 2023

(54) GAP UNIFORMITY DEVICE

(71) Applicant: Big Kid Blocks LLC, Saratoga Springs, UT (US)

(72) Inventor: Bryce William Green, Saratoga Springs, UT (US)

(73) Assignee: Big Kid Blocks LLC, Saratoga Spring, UT (US)

( * ) Notice: Subject to any disclaimer, the term of this patent is extended or adjusted under 35 U.S.C. 154(b) by 339 days.

(21) Appl. No.: 17/178,132

(22) Filed: Feb. 17, 2021

(65) Prior Publication Data
US 2022/0258326 A1    Aug. 18, 2022

(51) Int. Cl.
B25H 7/04 (2006.01)
B25G 1/10 (2006.01)
B62D 65/00 (2006.01)

(52) U.S. Cl.
CPC ............. *B25H 7/045* (2013.01); *B25G 1/102* (2013.01); *B62D 65/005* (2013.01)

(58) Field of Classification Search
CPC ... G01B 3/26; G01B 3/30; G01B 3/42; G01B 3/50; G01B 3/46
USPC ........................... 33/21.1, 194, 613, 645, 833
See application file for complete search history.

(56) References Cited

U.S. PATENT DOCUMENTS

| | | | | |
|---|---|---|---|---|
| 5,471,759 A * | 12/1995 | Burrows | ................... | G01B 3/30 7/164 |
| 5,551,162 A * | 9/1996 | Struble | ................... | G01B 5/14 33/546 |
| 5,657,550 A * | 8/1997 | Struble | ................... | G01B 5/14 33/544.4 |
| 5,768,794 A * | 6/1998 | Kelly | ...................... | G01B 3/46 33/542 |
| 6,438,859 B1* | 8/2002 | Lynch | ...................... | G01B 3/30 33/542 |
| 7,591,073 B1* | 9/2009 | Eckles | ...................... | G01B 3/30 33/562 |
| 8,286,362 B2* | 10/2012 | Petersheim | .............. | G01B 5/14 33/608 |
| 8,720,073 B1* | 5/2014 | Gordon | ............... | E04F 21/0015 33/194 |
| 9,573,209 B2* | 2/2017 | Scheibel | .................. | G01B 5/08 |
| 10,046,456 B2* | 8/2018 | Byrt | ...................... | B25H 7/005 |
| 10,571,235 B2* | 2/2020 | Stewart | .................... | G01B 3/42 |
| 10,935,360 B1* | 3/2021 | Mah | .......................... | G01B 3/30 |
| 10,976,145 B2* | 4/2021 | Feldman | .................. | G01B 5/18 |
| 11,009,333 B1* | 5/2021 | Zamora | .................... | G01B 3/56 |
| 2010/0050453 A1* | 3/2010 | Bryce | .................. | E04F 21/0076 33/527 |
| 2018/0319009 A1* | 11/2018 | Byrt | .......................... | G01B 3/30 |
| 2019/0277613 A1* | 9/2019 | Stewart | ..................... | G01B 3/14 |

* cited by examiner

*Primary Examiner* — George B Bennett
(74) *Attorney, Agent, or Firm* — Pate Nelson & Hill, PLLC (57) ABSTRACT

A device for creating a uniform gap between adjacent vehicle panels. The device includes an elongate member extending along a longitudinal axis between a first end and a second end. A grip portion is disposed along the elongate member between the first end and the second end. A first arm extends coaxially from the grip portion in a first direction, and a second arm extends coaxially from the grip portion in a second direction opposite the first direction.

20 Claims, 6 Drawing Sheets

GAP UNIFORMITY DEVICE

BACKGROUND

Field of the Invention

This invention relates to tools for performing fabrication, metalwork, bodywork and finish work on a vehicle.

Background

Seemingly small details are what separate a top-of-the-line custom car from an average one. For example, even a fantastic paint job can't compensate for poor bodywork underneath it, as any flaw in the bodywork will only be magnified by the topcoat. Similarly, good vehicle panel alignment with uniform gaps between every panel should be confirmed before any body or paint work is done. Perfect paint can't hide ill-fitting panels any more than it can sloppy bodywork. This is especially true for an older car that doesn't have all of its original panels.

Traditionally, ensuring gap uniformity between vehicle body panels tends to be difficult and time-consuming. Cutting and welding are inevitably involved, and it is difficult to perform those tasks perfectly to create the desired gap along the length of a vehicle body panel.

Accordingly, what are needed are devices and methods to improve the ease and accuracy of creating a uniform gap between adjacent body panels of a vehicle. Ideally, such devices and methods would reduce the time needed to ensure gap uniformity. Such devices and methods would also be simple to use, inexpensive to manufacture, and would reliably scribe a replicable and uniform gap between adjacent vehicle body panels.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure relates generally to devices and methods for creating a uniform gap between adjacent vehicle body panels. Some embodiments as disclosed herein may provide a small, lightweight device that is inexpensive to manufacture and simple to use. In some embodiments, the device may be configured to reliably scribe a replicable line that may be used create a uniform gap between adjacent vehicle panels.

In a first set of example embodiments, a device for creating a uniform gap between adjacent vehicle body panels may include an elongate member extending along a longitudinal axis. In some embodiments, the elongate member may have a first end and a second end. In some embodiments, a grip portion may be disposed along the elongate member between the first end and the second end. In some embodiments, a first arm may extend coaxially from the grip portion in one direction and a second arm may extend coaxially from the grip portion in another direction. In some embodiments, the second direction may be opposite the first direction.

In some embodiments, the elongate member may include a rigid bar formed of a metal, a plastic, and/or a composite material. In some embodiments, the grip portion may include a cross-sectional area that is greater than a cross-sectional area of the first arm and/or the second arm. In some embodiments, the grip portion may include a roughened surface. In some embodiments, a planar surface may be disposed opposite the grip portion. In some embodiments, the planar surface may extend between the first end and the second end.

In some embodiments, the first end and the second end may each include a blunt edge that may be perpendicular to the longitudinal axis. In other embodiments, the first end may include a hook feature. In certain embodiments, the hook feature may include a long side and a short side. In some embodiments, the long side of the hook feature may extend from the planar surface and/or may be integrated with the planar surface. In some embodiments, the short side may be opposite the long side. Some embodiments of the short side may be configured to scribe a scribe line into a vehicle panel.

In some embodiments, the second end may include an angled edge. In some embodiments, the angled edge may include an angle between 30 degrees and 90 degrees relative to the longitudinal axis. In some embodiments, the angled edge may be configured to scribe a scribe line into the vehicle panel.

In a second set of example embodiments, a device for creating a uniform gap between adjacent vehicle panels may include a gap tool. In some embodiments, the gap tool may be configured to scribe a length of a first vehicle panel located adjacent to a second vehicle panel. This may facilitate creation of a uniform gap therebetween.

In some embodiments, the gap tool may include an elongate member, a grip portion, and a planar surface. In some embodiments, the elongate member may extend along a longitudinal axis. In some embodiments, the elongate member may include a first end forming a hook feature. In some embodiments, the hook feature may include a long side and a short side. In some embodiments, the elongate member may also include a second end forming a sharp angled edge.

In some embodiments, the grip portion may be disposed along the elongate member between the hook feature and the sharp angled edge. In some embodiments, the planar surface may be disposed opposite the grip portion. In some embodiments, the planar surface may extend between the first end and the second end.

In some embodiments, the long side of the hook feature may be configured to maintain contact with a lip of the second vehicle panel as the gap tool is translated. In some embodiments, the short side of the hook feature may be configured to scribe a scribe line along the first vehicle panel as the long side of the hook feature is translated. In some embodiments, the planar surface may be configured to compare a surface of the first vehicle panel to a surface of the second vehicle panel.

In a third set of example embodiments, a method for creating a uniform gap between adjacent vehicle panels may include providing a second vehicle panel having a lip oriented adjacent to an edge of a first vehicle panel. In some embodiments, a first portion of a gap tool may be translated along the lip such that a second portion of the gap tool may be simultaneously translated along the edge of the first vehicle panel. In some embodiments, a scribe line may be scribed along the edge of the first vehicle panel with the second portion of the gap tool.

In some embodiments, translating the first end may include contacting the lip with a long side of a hook feature.

In some embodiments, scribing the scribe line may include contacting the edge of the first vehicle panel with a short side of the hook feature.

It is to be understood that both the foregoing general description and the following detailed description are examples and explanatory and are not restrictive of the embodiments as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments. The following detailed description is, therefore, not to be taken in a limiting sense.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

As described above, exactness in vehicle panel alignment and uniform gaps between panels is of paramount importance to achieving a high-quality finished result. Traditional methods of ensuring gap uniformity between vehicle body panels tend to be difficult and time-consuming. It is difficult to ascertain the exact amount of cutting and welding needed between adjacent vehicle panels to achieve quality results. It is also difficult to perform those tasks perfectly.

Figure 1:
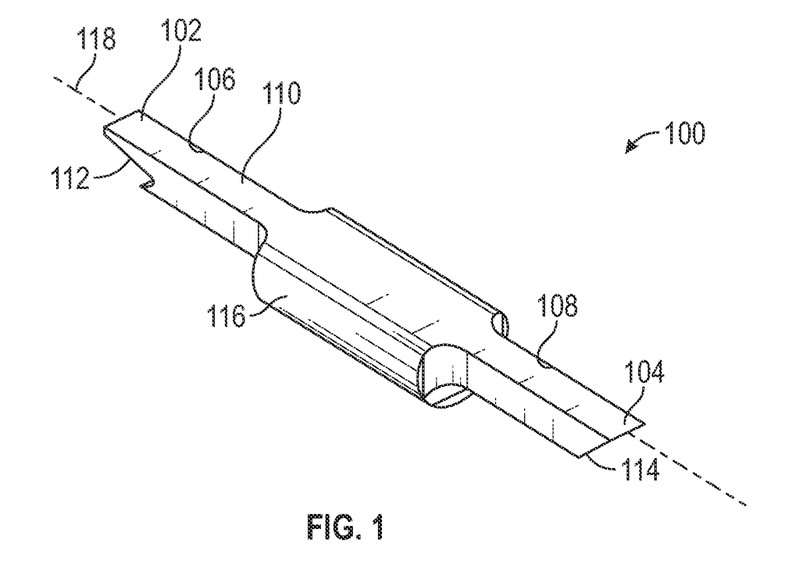
FIG. 1 is a perspective view of a gap uniformity device in accordance with some embodiments.

Referring to FIG. 1, in some embodiments, a device 100 for creating a uniform gap between adjacent vehicle body panels may include an elongate member 110 extending along a longitudinal axis 118. In some embodiments, the elongate member 110 may be a rigid bar. In some embodiments, the elongate member 110 may be sufficiently small such that it may be handheld. In some embodiments, the elongate member 110 may be constructed of steel, plastic, composite, or another suitable material.

In one embodiment, for example, the elongate member 110 may be formed of 3/16 bar stock. In some embodiments, the material forming the elongate member 110 may include a hardness and/or tensile strength sufficient to resist plastic deformation, penetration, indentation, and/or scratching by application of force against a vehicle body. In some embodiments, as described in more detail below, the hardness and/or tensile strength may be sufficient to scribe, scratch, indent or otherwise create a permanent mark on the vehicle body.

In some embodiments, the elongate member 110 may have a first end 102 and a second end 104. In some embodiments, the first end 102 may be disposed at an end of a first arm 106 and the second end 104 may be disposed at an end a second arm 108. In some embodiments, the first arm 106 and the second arm 108 may extend in opposite directions along the longitudinal axis 118.

In some embodiments, the first end 102 and/or the second end 76 may include a feature or tool coupled thereto or integrated therewith. In some embodiments, the first end 102 and the second end 104 may include unique features or tools. In other embodiments, the first end 102 and the second end 104 may include features or tools that are similar or identical.

As shown in FIG. 1, in some embodiments the first end 102 may include a hook feature 112 and the second end 104 may include an angled edge 114. As shown, in some embodiments a grip portion 116 may be disposed along the elongate member 110 between the first end 102 and the second end 104. In some embodiments, the grip portion 116 may be enlarged relative to adjacent portions of the elongate member 110 such as the first arm 106 and the second arm 108, for example.

In some embodiments, the grip portion 116 may include a cylindrical, rectangular, geometric, irregular, or other suitable three-dimensional shape. In some embodiments, the grip portion 116 may be formed to include a flat top surface and a rounded or substantially cylindrical bottom surface. In this manner, in some embodiments, the grip portion 116 may facilitate a secure grip of the elongate member 110. Further, in some embodiments, the grip portion 116 may include a textured or roughened surface. In some embodiments, the grip portion 116 may include fabric, rubber, or another suitable material or covering coupled to or integrated with a surface of the grip portion 116 or portion thereof.

In some embodiments, the elongate member 110 may include a planar surface 120 extending between the first end 102 and the second end 104. In some embodiments, the planar surface 120 may be smooth or textured. In some embodiments, a portion of the planar surface 120 may be enlarged to correspond to the grip portion 116. In some embodiments, at least a portion of the planar surface 120 may be inscribed or printed to include a name, logo or other desired insignia to identify the user or manufacturer, for example. In some embodiments, the insignia may be coupled to the planar surface 120 via an adhesive or other suitable coupling mechanism known to those in the art.

Figure 2:
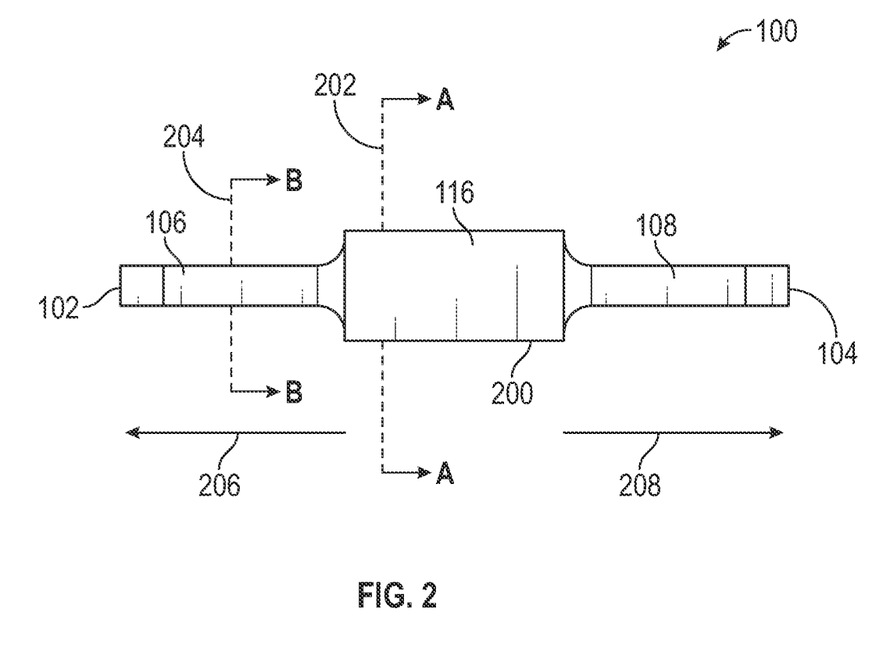
FIG. 2 is a bottom view of the gap uniformity device of FIG. 1.

Referring now to FIG. 2, in some embodiments, a cross-sectional area 202 of the grip portion 116 may be greater than a cross-sectional area 204 of an adjacent portion of the elongate member 110. For example, as shown in FIG. 2, in some embodiments, a cross-sectional area 202 of the grip portion 116 taken along line A-A may be greater than a cross-sectional area 204 of a first arm 106 of the elongate member 110 taken along B-B. As mentioned above, the difference in size and between the grip portion cross-sectional area 202 and the arm cross-sectional area 204 may facilitate a secure grip on the device 100 and precise manipulation and/or use of a tool or feature coupled to or integrated with an end 102, 104 of the elongate member 110.

In some embodiments, the grip portion 116 may be substantially centered along a length of the elongate member 110. In some embodiments, the first arm 106 may extend coaxially from the grip portion 116 in a first direction 206 to the first end 102. Similarly, in some embodiments, the second arm 108 may extend coaxially from the grip portion 116 in a second direction 208 to the second end 104. In some embodiments, the first direction 206 may be opposite the second direction 208.

Figure 3:
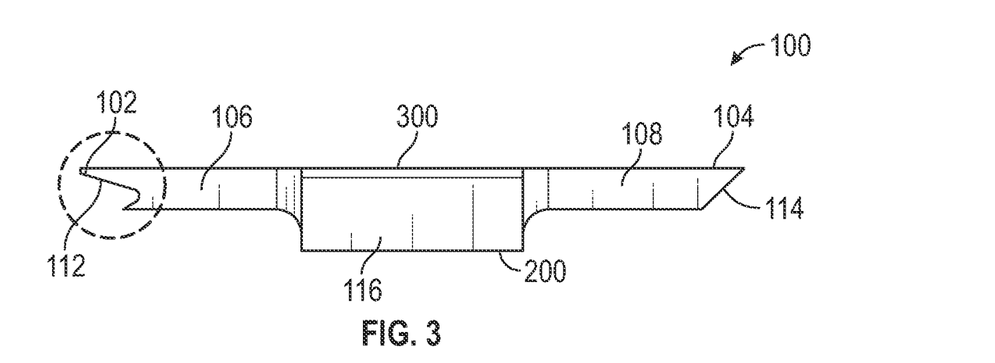
FIG. 3 is a side view of the gap uniformity device of FIG. 1.
Figure 4A:
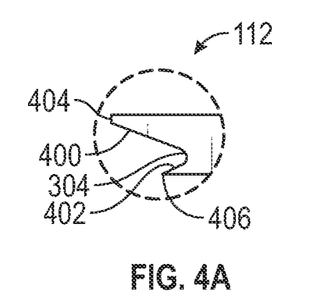
FIG. 4A is an enlarged side view of a hook feature in accordance with some embodiments.
Figure 4B:
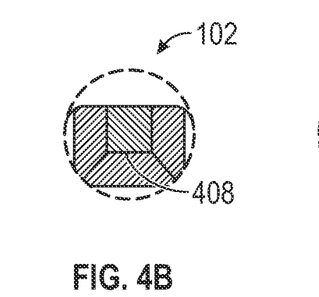
FIG. 4B is an enlarged view of one end of a gap uniformity device in accordance with some embodiments.
Figure 4C:
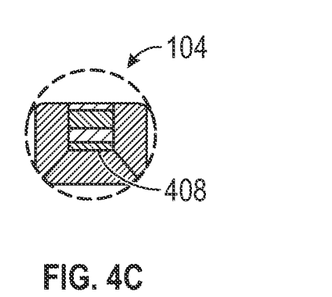
FIG. 4C is an enlarged view of an opposite end of a gap uniformity device in accordance with some embodiments.
Figure 5:
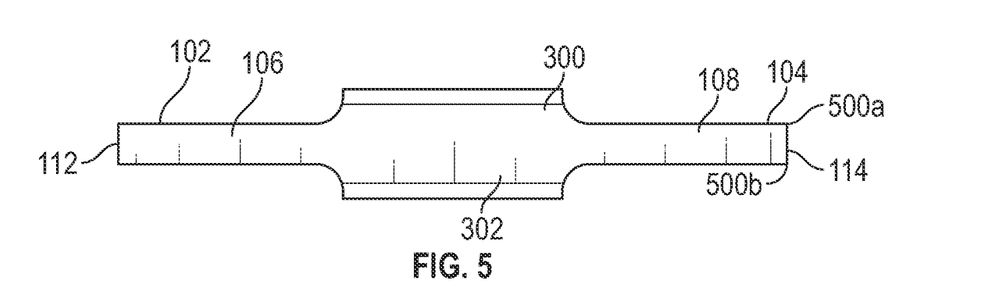
FIG. 5 is a top view of a planar surface of a gap uniformity device in accordance with certain embodiments.

Referring now to FIGS. 3-5, in some embodiments, the first end 102 may include a hook feature 112 monolithically formed with the elongate member 110 as a single unit. In other embodiments, the hook feature 112 may be coupled to the first end 102 of the elongate member 110. In some embodiments, the hook feature 112 may be extend parallel to the longitudinal axis 118 such that the hook feature 112 is disposed opposite the planar surface 300. In some embodiments, the hook feature 112 may be aligned with the grip portion 116.

In some embodiments, the hook feature 112 may include a long side 400 and a short side 402 that meet at a vertex 304 to resemble a parabola or letter "J." In some embodiments, the long side 400 of the hook feature 112 may extend from the planar surface 120 such that the long side 400 is angled inward toward the grip portion 116 relative to the planar surface 120 and the first end 102. At the vertex 304, in some embodiments, the short side 402 may then angle back outward towards the first end 102.

Referring now to FIG. 4A, in some embodiments, the first end 102 may terminate in a blunt edge 404 and the long side 400 may extend therefrom. In this manner, in some embodiments, the blunt edge 404 may protect the vehicle body or panel for inadvertently being scratched or damaged. In some embodiments, the short side 402 may terminate in a sharp edge or point 406. In this manner, the short side 402 may be configured to scribe, scratch or otherwise mark a surface of a vehicle body panel, as described in more detail below.

Referring now to FIG. 4B, in other embodiments, the first end 102 may include a sharp edge 408 to enable the vehicle body or panel to be scribed or otherwise marked. Similarly, as shown in FIG. 4C, in some embodiments, the second end 104 may include a sharp edge 408 to facilitate scribing or otherwise marking the vehicle.

Referring now to FIG. 5, for example, in some embodiments, the sharp edge 408 of the second end 104 may include a sharp angled edge 114, point, or other sharp surface configured to scratch or otherwise mark a vehicle. In some embodiments, the sharp angled edge 114 may extend in an inward direction relative to the planar surface 120 such that it angles inward toward a center of the elongate member 110 or the grip portion 116. In this manner, in some embodiments, the angled edge 114 may create a sharp edge perpendicular to the longitudinal axis 118.

In some embodiments, the angled edge 114 may create one or more points or corners 500a, 500b corresponding to an intersection between the planar surface 120 and the angled edge 114. In other words, in some embodiments, the sharp edge 408 may correspond to a width of the second end 104 of the elongate member 110. In some embodiments, the angled edge 114 may extend from the sharp edge 408 and include a forty-five degree machine cut, for example. In some embodiments, the angled edge 114 may include an angle between zero degrees)(0° and ninety degrees)(90° relative to the planar surface 120. In some embodiments, the angled edge 114 may include an angle between thirty degrees)(0° and ninety degrees)(90° relative to the planar surface 120. In some embodiments, the angled edge 114 and/or one or more corners 500a, 500b created thereby may be configured to scribe a vehicle or vehicle panel.

Figure 6:
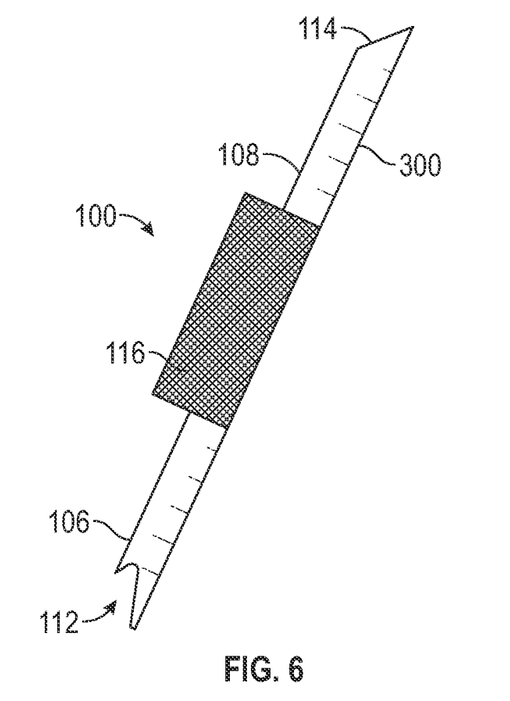
FIG. 6 is a side view of a gap uniformity device having a sharp edge in accordance with certain embodiments.
Figure 7:
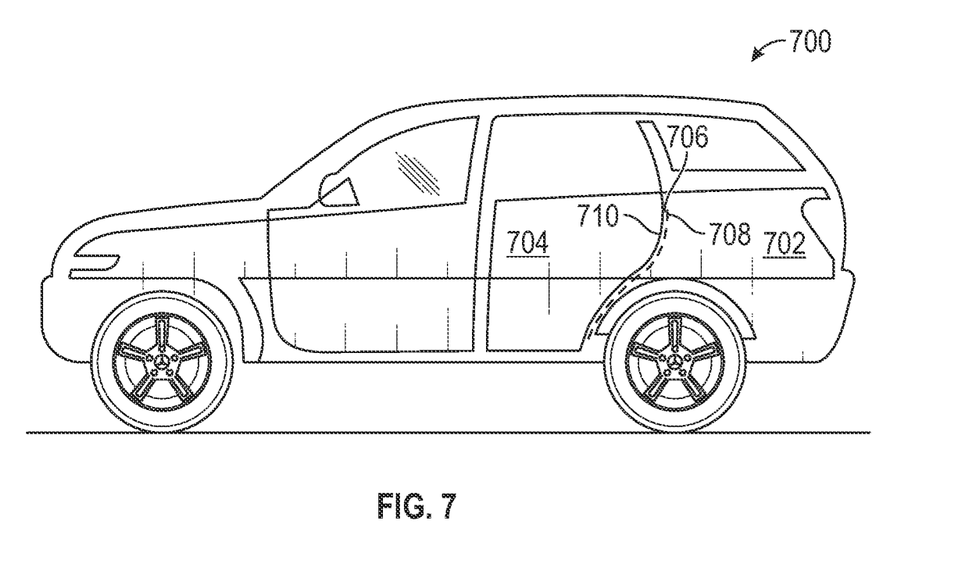
FIG. 7 is a side plan view of a vehicle having adjacent body panels in accordance with some embodiments.

Referring now to FIGS. 6 and 7, in some embodiments, the first end 102 of the device 100 may include a first feature or tool and the second end 104 may include a second feature or tool. In certain embodiments, the first end 102 and/or second end 104 may include more than one feature or tool. In some embodiments, as shown, the grip portion 116 may be substantially centered along a length of the elongate member 110. In this manner, in some embodiments, the grip portion 116 may enable a user to rotate the elongate member 110 to alternate between using the first end 102 and the second end 104 as desired. In some embodiments, the grip portion 116 may include a textured or roughened surface 200 to facilitate a secure grip as the device 100 is oriented to use in any of various positions.

As shown in FIG. 6, in some embodiments, the first end 102 may form the hook feature 112 to stabilize the device 100 against an edge of a vehicle panel, for example. In some embodiments, the second end 104 may be opposite the first end 102 and may form the angled edge 114 to freely scribe or mark a vehicle as desired.

As shown in FIG. 7, in some embodiments, a vehicle 700 may include adjacent vehicle panels 702, 704. In some embodiments, the first vehicle panel 702 may include an edge 712 running substantially vertically from the top of the vehicle 700 to the bottom of the vehicle 700. In some embodiments, the second vehicle panel 704 may include a lip 710 adjacent and substantially corresponding to the edge 712 of the first vehicle panel 702. In some embodiments, the first vehicle panel 702 and the second vehicle panel 704 may include a gap 706 therebetween.

In some embodiments, the device 100 may be positioned adjacent to or within the gap 706 between the first vehicle panel 702 and the second vehicle panel 704. In some embodiments, the device 100 may be stabilized against the second vehicle panel 704 and used to scribe a scribe line 708 along the first vehicle panel 702. In some embodiments, the scribe line 708 may be used as a reference to create a uniform gap 706 between the first vehicle panel 702 and the second vehicle panel 704.

For example, in some embodiments, the edge 712 of the first vehicle panel 702 may be cut and/or welded as needed to conform to the scribe line 708. In this manner, in some embodiments, the scribe line 708 may thereby facilitate creation of a uniform gap 706 between the first vehicle panel 702 and the second vehicle panel 704.

Figure 8:
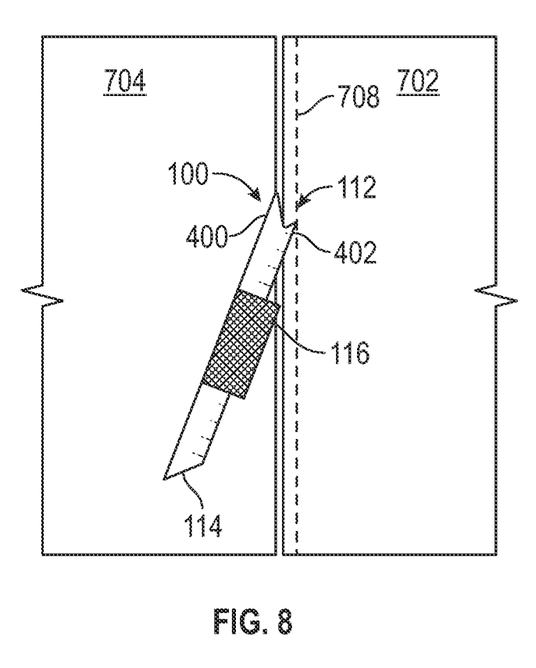
FIG. 8 is a front view of adjacent vehicle panels and a use of a gap uniformity device to create a uniform gap therebetween in accordance with some embodiments.

Referring now to FIG. 8, in some embodiments, the long side 400 of the hook feature 112 may be stabilized against the lip 710 of the second vehicle panel 704. In some embodiments, a distance between the first vehicle panel 702 and the second vehicle panel 704 may be such that the short side 402 of the hook feature 112 contacts and scribes the edge 712 of the first vehicle panel 702 as the device 100 traverses the lip 710. In this manner, in some embodiments, the short side 402 of the hook feature 112 may scribe a uniform scribe line 708 along the first vehicle panel 702 as the long side 400 of the hook feature 112 is translated along the lip 710.

In some embodiments, the device 100 may be rotated with respect to the grip portion 116 or otherwise re-oriented to enable the second end 104 to contact the vehicle 700. In some embodiments, the second end 104 may include the angled edge 114, point, or corner 500 that may be used to scribe the first vehicle panel 702, second vehicle panel 704 or any other suitable location on the vehicle 700 as desired.

Figure 9:
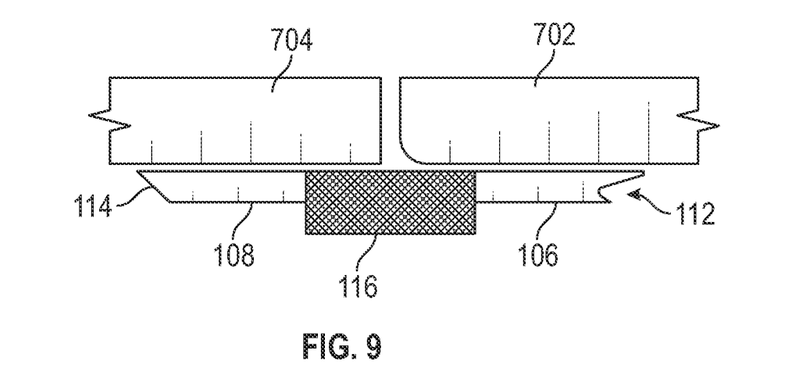
FIG. 9 is a top view of a planar surface of an example gap uniformity device spanning adjacent vehicle panels in accordance with some embodiments.
Figure 10:
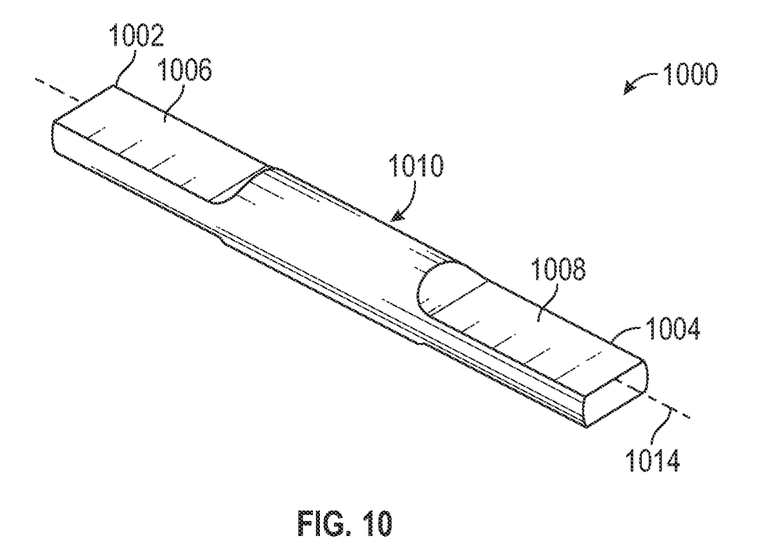
FIG. 10 is a perspective view of another embodiment of a gap uniformity device.

Referring now to FIG. 9, in some embodiments, the device 100 may include the planar surface 120 which may extend along the elongate member 110 from the first end 102 to the second end 104. In some embodiments, the planar surface 120 may extend along at least a portion of the elongate member 110 between the first end 102 and the second end 104. In some embodiments, the planar surface 120 may be disposed opposite the grip portion 116.

In some embodiments, the device 100 may be positioned and oriented such that the planar surface 120 of the elongate member 110 spans the lip 710 of the second vehicle panel 704, the gap 706, and the edge 712 of the first vehicle panel 702. In some embodiments, the planar surface 120 may contact the second vehicle panel 704 and the first vehicle panel 702. In some embodiments, positioning the planar surface 120 in this manner may facilitate identification of any irregularity between the surfaces of the first vehicle panel 702 and the second vehicle panel 704.

Referring now to FIGS. 10-13, in some embodiments, the device 1000 may include an elongate member 1010 made of a plastic or composite material such that contact between the elongate member 1010 and the vehicle 700 may not damage any paint or finish of the vehicle 700. In some embodiments, the elongate member 1010 may include a coating or covering applied to at least a portion thereof. In some embodiments, the covering may include fabric, rubber, plastic, composite, or any other suitable material. In some embodiments, the covering may be smooth or textured.

In some embodiments, the elongate member 1010 may extend along a longitudinal axis 1014 and may include a first end 1002 and a second end 1004. In some embodiments, the first end 1002 and the second end 1004 may each be formed as a blunt edge 1116a, 1116b substantially perpendicular to the longitudinal axis 1014. In some embodiments, the first end 1002 and/or second end 1004 may be rounded or otherwise formed to avoid damaging the vehicle 700 upon contact.

Figure 11:
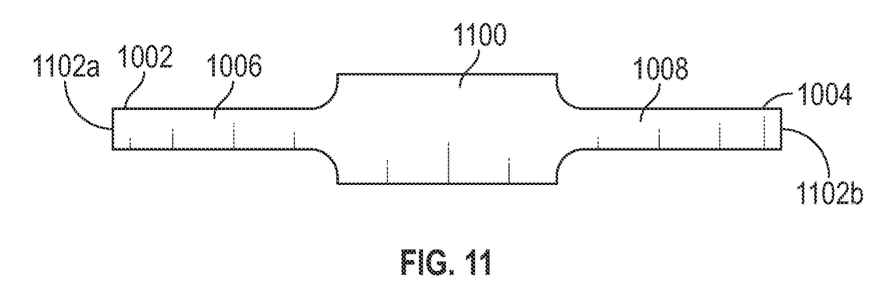
FIG. 11 is a side view of the embodiment of the gap uniformity device illustrated in FIG. 10.
Figure 12:
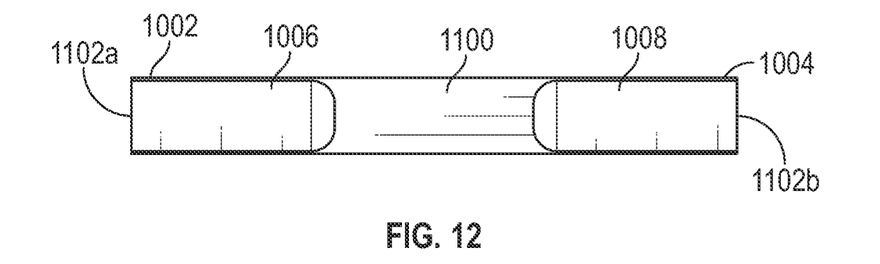
FIG. 12 is a top view of the embodiment of the gap uniformity device illustrated in FIG. 10.
Figure 13:
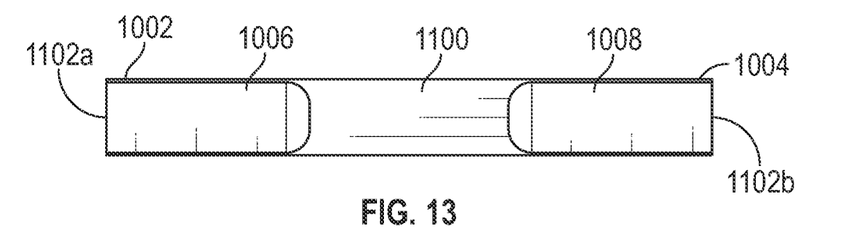
FIG. 13 is a bottom view of the embodiment of the gap uniformity device illustrated in FIG. 10.

Referring now to FIG. 11, in some embodiments, the elongate member 1010 may include a first arm 1006 and a second arm 1008 extending in opposite directions along the longitudinal axis 1014. In some embodiments, the first arm 1006 and the second arm 1008 may be separated by a grip portion 1100 disposed along the elongate member 1010. In some embodiments, the grip portion 1100 may be substantially centrally located along a length of the elongate member 1010.

In some embodiments, the grip portion 1100 may include enlarged proportions and/or increased surface area relative to each of the arms 1006, 1008. In some embodiments, the grip portion 1100 may be substantially cylindrical and/or rounded and each arm 1006, 1008 may be substantially flat and/or rectangular. In some embodiments, the elongate member 1010 may include a planar surface disposed opposite the grip portion 1112. In some embodiments, the planar surface 1112 may extend between the first end 1002 and the second end 1004 of the elongate member 1010.

In some embodiments, a width of each of the arms 1006, 1008 may be selected to enable the first end 1002 and/or the second end 1004 of the elongate member 1010 to be placed adjacent to or within the gap 706 between adjacent vehicle panels 702, 704. In this manner, in some embodiments, the first end 1002 and/or the second end 1004 may avoid damaging the paint or finish of the vehicle 700 while facilitating creation of a uniform gap between adjacent vehicle panels 702, 704.

In some embodiments, the first end 1002 may include a blunt edge 1102a having a first width or dimensions and the second end 1004 may include a blunt edge 1102b having a second width or dimensions. In some embodiments, the first width or dimensions may be the same as the second width or dimensions.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A device for creating a uniform gap between adjacent vehicle panels, comprising:
    an elongate member extending along a longitudinal axis, the elongate member comprising a first end and a second end;
    a grip portion disposed along the elongate member between the first end and the second end;
    a planar surface disposed opposite the grip portion; and
    a first arm extending coaxially from the grip portion in a first direction; and a second arm extending coaxially from the grip portion in a second direction, wherein the second direction is opposite the first direction.

2. The device of claim 1, wherein the planar surface extends between the first end and the second end.

3. The device of claim 1, wherein each of the first end and the second end comprises a blunt edge.

4. The device of claim 3, wherein the blunt edge is perpendicular relative to the longitudinal axis.

5. The device of claim 1, wherein the first end comprises a hook feature.

6. The device of claim 5, wherein the hook feature comprises a long side and a short side, wherein the long side comprises an extension of the planar surface and wherein the short side is opposite the long side.

7. The device of claim 6, wherein the short side is configured to scribe a scribe line into a vehicle panel.

8. The device of claim 7, wherein the elongate member comprises a rigid bar formed from at least one of a metal, a plastic, and a composite material.

9. The device of claim 1, wherein the grip portion comprises a cross-sectional area greater than a cross-sectional area of at least one of the first arm and the second arm.

10. The device of claim 1, wherein the grip portion comprises a roughened surface.

11. The device of claim 1, wherein the second end comprises an angled edge.

12. The device of claim 11, wherein the angled edge comprises an angle between 30 degrees and 90 degrees relative to the longitudinal axis.

13. The device of claim 12, wherein the angled edge is configured to scribe a panel line into vehicle panel.

14. A device for creating a uniform gap between adjacent vehicle panels, comprising:
   a gap tool configured to scribe a first vehicle panel located adjacent to a second vehicle panel to create a uniform gap therebetween, the gap tool comprising:
      an elongate member extending along a longitudinal axis, the elongate member comprising a first end forming a hook feature having a long side and a short side, and a second end forming a sharp angled edge;
      a grip portion disposed along the elongate member between the hook feature and the sharp angled edge; and
      a planar surface disposed opposite the grip portion, wherein the planar surface extends along the elongate member from the first end and the second end.

15. The device of claim 14, wherein the long side of the hook feature is configured to maintain contact with a lip of the second vehicle panel as the gap tool is translated.

16. The device of claim 15, wherein the short side of the hook feature is configured to scribe a scribe line along the first vehicle panel as the long side of the hook feature is translated along the lip of the second vehicle panel.

17. The device of claim 14, wherein the planar surface is configured to compare a level of the first vehicle panel to a level of the second vehicle panel.

18. A method for evaluating a gap between adjacent vehicle panels, comprising:
   providing a second vehicle panel having a lip oriented adjacent to an edge of a first vehicle panel;
   providing a gap tool, wherein the gap tool comprises an elongate member comprising a hook feature at a first end, an angled edge at a second end, a grip portion disposed along the elongate member between the first end and the second end, and a planar surface disposed opposite the grip portion and extending along the elongate member from the first end to the second end; and
   comparing a level of the first vehicle panel to a level of the second vehicle panel using the planar surface.

19. The method of claim 18, further comprising:
   translating a long side of the hook feature along the lip such that the second end is simultaneously translated along the edge of the second vehicle panel; and
   contacting the edge of the first vehicle panel with a short side of the hook feature and scribing a scribe line along the edge of the first vehicle panel with the short side.

20. The method of claim 19, further comprising:
   scribing the second vehicle panel using the angled edge.

* * * * *